(12) United States Patent
Marks et al.

(10) Patent No.: US 9,862,477 B2
(45) Date of Patent: Jan. 9, 2018

(54) AIRCRAFT STRUCTURE

(71) Applicant: AIRBUS OPERATIONS LIMITED, Bristol (GB)

(72) Inventors: Oliver Marks, Bristol (GB); Steven Evans, Bristol (GB)

(73) Assignee: AIRBUS OPERATIONS LIMITED, Bristol (GB)

( * ) Notice: Subject to any disclaimer, the term of this patent is extended or adjusted under 35 U.S.C. 154(b) by 99 days.

(21) Appl. No.: 14/793,599

(22) Filed: Jul. 7, 2015

(65) Prior Publication Data

US 2016/0009366 A1 Jan. 14, 2016

(30) Foreign Application Priority Data

Jul. 8, 2014 (GB) .................................. 1412158.6

(51) Int. Cl.
| | |
|---|---|
| *B64C 1/00* | (2006.01) |
| *B64C 3/18* | (2006.01) |
| *B64C 1/06* | (2006.01) |
| *B64C 1/12* | (2006.01) |
| *B64C 3/26* | (2006.01) |

(Continued)

(52) U.S. Cl.
CPC ................ *B64C 3/18* (2013.01); *B29C 53/04* (2013.01); *B64C 1/06* (2013.01); *B64C 1/064* (2013.01); *B64C 1/065* (2013.01); *B64C 1/12* (2013.01); *B64C 3/182* (2013.01); *B64C 3/187* (2013.01);

(Continued)

(58) Field of Classification Search
CPC .. B64C 3/187; B64C 3/26; B64C 3/18; B64C 5/00; B64C 3/182; B64C 3/00
See application file for complete search history.

(56) References Cited

U.S. PATENT DOCUMENTS

| | | | |
|---|---|---|---|
| 4,228,976 A | * 10/1980 | Eiselbrecher | ............. B64C 1/26 244/131 |
| 5,242,523 A | 9/1993 | Willden et al. | |

(Continued)

FOREIGN PATENT DOCUMENTS

| | | |
|---|---|---|
| DE | 102007029500 A1 | 1/2009 |
| DE | 102007054053 A1 | 5/2009 |

(Continued)

OTHER PUBLICATIONS

European Search Report dated Oct. 30, 2015 EP Application No. 15175757.

*Primary Examiner* — Assres H Woldemaryam
(74) *Attorney, Agent, or Firm* — Hauptman Ham, LLP

(57) ABSTRACT

A structure having a panel, a stringer, and a rib is disclosed. The stringer includes a stringer flange that is joined to the panel and a stringer web that extends away from the stringer flange. The rib includes a rib web that has first and second faces and a rib foot that has a first rib foot flange that is joined to the stringer web, a second rib foot flange that is joined to the panel and a rib foot web that is joined to the first face of the rib web. The first rib foot flange is connected to the rib foot web by a first corner that includes at least one layer which runs continuously from the first rib foot flange into the rib foot web via the first corner. The second rib foot flange is connected to the rib foot web by a second corner that includes at least one layer which runs continuously from the second rib foot flange into the rib foot web via the second corner.

20 Claims, 6 Drawing Sheets

(51) Int. Cl.
 *B29C 53/04* (2006.01)
 *B64C 5/00* (2006.01)
 *B29L 31/00* (2006.01)

(52) U.S. Cl.
 CPC .............. *B64C 3/26* (2013.01); *B64C 5/00* (2013.01); *B29L 2031/001* (2013.01)

(56) References Cited

U.S. PATENT DOCUMENTS

| | | | |
|---|---|---|---|
| 6,386,481 | B1 | 5/2002 | Kallinen |
| 6,415,496 | B1 * | 7/2002 | Dominguez Casado . B64C 1/06 244/131 |
| 7,635,106 | B2 * | 12/2009 | Pham ...................... B64C 3/182 244/123.1 |
| 8,056,859 | B2 * | 11/2011 | Kunichi .................. B21J 15/14 244/123.1 |
| 2001/0051251 | A1 | 12/2001 | Noda et al. |
| 2005/0241358 | A1 * | 11/2005 | Kaye ........................ B64F 5/10 72/379.2 |
| 2006/0226287 | A1 | 10/2006 | Grantham et al. |
| 2008/0223987 | A1 * | 9/2008 | Halme ................... B64C 3/187 244/123.1 |
| 2010/0148008 | A1 * | 6/2010 | Hernando ............... B64C 3/187 244/131 |
| 2010/0272954 | A1 | 10/2010 | Roming et al. |
| 2010/0308172 | A1 | 12/2010 | Depeige |
| 2011/0001010 | A1 | 1/2011 | Tacke et al. |
| 2011/0089291 | A1 | 4/2011 | Dietrich et al. |
| 2012/0193475 | A1 | 8/2012 | Cabanac et al. |
| 2013/0048187 | A1 * | 2/2013 | Wiles .................... B29C 70/086 156/60 |
| 2013/0119191 | A1 * | 5/2013 | Wolfe ..................... B29C 70/42 244/54 |
| 2013/0344291 | A1 * | 12/2013 | Pearson ................ B29C 70/865 428/157 |
| 2014/0113107 | A1 * | 4/2014 | Kremer .................... B64C 3/18 428/121 |
| 2014/0166811 | A1 * | 6/2014 | Roming ................. B64C 1/061 244/131 |
| 2014/0216638 | A1 * | 8/2014 | Vetter ................. B29D 99/0014 156/227 |
| 2014/0263836 | A1 | 9/2014 | Guillemaut et al. |

FOREIGN PATENT DOCUMENTS

| | | |
|---|---|---|
| EP | 2481668 A1 | 8/2012 |
| FR | 2923800 A1 | 5/2009 |
| GB | 132153 A | 1/1919 |
| WO | 2004018183 A1 | 3/2004 |
| WO | 2008067460 A2 | 6/2008 |
| WO | 2012098331 A2 | 7/2012 |
| WO | 2012143363 A2 | 10/2012 |
| WO | 2014175795 A1 | 10/2014 |
| WO | 2015015152 A1 | 2/2015 |

* cited by examiner

AIRCRAFT STRUCTURE

RELATED APPLICATIONS

The present application claims priority from Great Britain Application Number 1412158.6, filed Jul. 8, 2014, the disclosure of which is hereby incorporated by reference herein in its entirety.

FIELD OF THE INVENTION

The present invention relates to a structure. More particularly, although not exclusively, the present invention relates to an aircraft structure, for example a wing, horizontal stabiliser or vertical stabiliser.

BACKGROUND OF THE INVENTION

Traditional aircraft wings have a wing box formed by upper and lower aerodynamic covers, front and rear spars, and a series of transverse ribs spaced apart along the span-wise length of the wing box. Each rib is bolted to the upper and lower covers and reacts fuel pressure loads between them.

Assembly of such a wing box can be very time-consuming and complicated due to the need to manufacture, drill, shim and then bolt many components together. A traditional wing box is also very heavy and does not always make the most efficient use of modern aerospace materials such as composites.

It is desirable to design an aircraft wing box or similar which has a reduced part count, simplified manufacturing process and improved mechanical performance.

SUMMARY OF THE INVENTION

A first aspect of the invention provides a structure having a panel, a stringer and a rib, wherein the stringer includes a stringer flange joined to the panel and a stringer web extending away from the stringer flange; and the rib includes a rib web having first and second faces which meet at an edge, and a rib foot having a first rib foot flange joined to the stringer web, a second rib foot flange joined to the panel or to the stringer flange, and a rib foot web joined to the first face of the rib web adjacent to the edge of the rib web; wherein the first rib foot flange is connected to the rib foot web by a first corner including at least one layer which runs continuously from the first rib foot flange into the rib foot web via the first corner, the second rib foot flange is connected to the rib foot web by a second corner including at least one layer which runs continuously from the second rib foot flange into the rib foot web via the second corner, one of the rib foot flanges extends away from the first face of the rib web, and the other of the rib foot flanges passes across the edge of the rib web and extends away from the second face of the rib web.

The continuous construction of the rib foot enables it to be formed as a single part. This enables the number of components in the structure to be reduced and provides potential for the overall weight of the structure to be reduced.

The two rib foot flanges extend on opposite sides of the rib web, giving a more balanced arrangement than if both extended away from the first face of the rib web.

Typically the first rib foot flange, the second rib foot flange and the rib foot web are formed integrally. By way of example, they may be formed as a single piece which is then bent or folded to form the first and second corners. Alternatively they may be formed integrally by laying them up on a mould tool with an automated tape laying machine, with the first and second corners being formed as the tape is laid onto the mould tool. Alternatively, they may be formed integrally by injection moulding or casting.

Regardless of the method of formation of the rib foot, the layers which run around the corners provide efficient load transfer between the adjacent parts of the rib foot which are connected by the corner.

The construction of the rib foot also enables multiple flange angles to be accommodated or compensated for, which reduces the time and cost associated with controlling joints for tolerance and fit requirements.

Preferably the rib foot comprises at least one layer which runs around the first and second corners.

The connection between the first rib foot flange and the stringer web provides a robust load path. Typically the first rib foot flange is joined to the stringer web by a joint which can transmit load in shear from the stringer web to the first rib foot flange.

The rib foot may have a third rib foot flange (which may be triangular) that is joined to the panel or to the stringer flange and connected to the first rib foot flange by a third corner including at least one layer which runs continuously from the third rib foot flange to the first rib foot flange via the third corner. Additionally or alternatively, the rib foot may further comprise a fourth rib foot flange (which may be triangular) that is joined to the stringer web and connected to the second rib foot flange by a fourth corner including at least one layer which runs continuously from the fourth rib foot flange to the second rib foot flange via the fourth corner.

The second rib foot flange may extend away from the first face of the rib web, the first rib foot flange passing across the edge of the rib web and extending away from the second face of the rib web, or vice versa.

The stringer web may pass through a recess in the edge of the rib web. In this case the second rib foot flange may extend away from the first face of the rib web, with the first rib foot flange passing across the edge of the rib through the recess (along with the stringer flange to which it is joined).

The first and/or third rib foot flange may be joined to both the panel and the stringer flange. Alternatively, the first and/or third rib foot flange may be joined only to the stringer flange (optionally via a protruding grow-out region of the stringer flange).

The structure may only have a single panel. Alternatively, the structure may further comprise a second panel opposite to the first panel. The rib web is typically arranged to transmit load (such as fuel pressure load) between the first panel and the second panel. Typically the rib web is joined to the second panel, either directly or via additional rib feet.

The structure may have only one stringer, but more typically it has a plurality of stringers joined to the panel with each stringer joined to the rib web by a respective rib foot.

The structure may have only one rib, or it may have more than one rib with each rib joined to the stringer by a respective rib foot.

The panel is typically elongate with a width and a length.

The stringer is typically elongate with a width and a length.

The length of the panel and the stringer are typically approximately parallel.

The rib typically extends across the width of the panel.

The stringer may have a variety of cross-sectional shapes, including a T-shape, a Z-shape or a top hat shape.

The stringer web may be a blade which extends away from the stringer to an elongate edge.

The rib may form a liquid-tight seal with the panel. Alternatively, the rib may allow liquid to flow across it, for example a gap may be provided between the rib web and the panel, the gap being arranged to permit liquid to flow through the gap.

Typically the edge has a recess or a cut-out through which the stringer web passes. In the case of a sealed rib then the stringer web may form a liquid tight seal with the rib web. Alternatively, a gap is provided between the rib web and the stringer web, the gap being arranged to permit liquid to flow through the gap.

The rib foot may be formed from a non-composite material (such as a metal) or a composite material including reinforcement elements embedded in a matrix. The reinforcement elements may, for example, comprise carbon fibre and/or glass fibre and/or Kevlar and/or metallic reinforcement in a polymer matrix. The panel and/or stringer and/or the rib web may also comprise a composite material of the same or different construction to the rib foot.

The rib foot may comprise a single layer of non-laminar material (such as a single piece of cast metal) which runs continuously around the first and second corners. Alternatively, the rib foot may comprise a laminar material with a plurality of layers. In the case of a laminar material then each folded corner typically comprises a plurality of layers which run continuously around the corner.

The rib foot may be formed by arranging a stack of dry reinforcement plies together and subsequently adding matrix material to the stack before curing to form a consolidated component, or alternatively by arranging a stack of pre-preg plies comprising reinforcement material before curing to form a consolidated component. Additionally or alternatively, the composite material may comprise randomly distributed reinforcement. For example, the rib foot may be formed as an injection moulded component with chopped strands or nano-tubes or particles of reinforcement material distributed through at least a portion of the composite material.

Preferably the rib foot is formed from a composite material comprising a plurality of fibres, wherein some of the fibres run continuously from the first rib foot flange into the rib foot web via the first corner, and some of the fibres run continuously from the second rib foot flange into the rib foot web via the second corner.

The rib foot may be joined to the rib web and/or to the panel and/or to the stringer flange and/or to the stringer web by a bonded joint—for instance: a co-cured joint, a co-bonded joint or a secondary bonded joint. This removes or reduces the need for drilling and/or bolting through the rib foot, the stringer and/or the panel, which increases the strain resistance of the structure and reduces the component weight. The reduced number of external fasteners also provides protection against lightning strike and improve fuel tank sealing if the structure is part of a fuel tank.

Additionally or alternatively, the rib foot may be joined to the panel and/or to the rib web and/or to the stringer flange and/or to the stringer web by one or more mechanical fasteners.

The structure may be adapted to carry fuel. In this case, the panel typically forms part of a sealed wall of a fuel tank which is arranged such that, when the fuel tank contains fuel, fuel pressure load acts on the panel.

The rib web may form a sealed fuel tank wall (that is a boundary wall adapted to retain fuel on one side of the wall with substantially no movement of fuel through the wall to an opposite side of the wall) or alternatively it may be an internal baffle (that is an internal element within a fuel tank adapted to allow fuel to pass from one side to the other via one or more orifices or holes).

The structure is typically part of an aerodynamic aircraft structure such as a wing box, a horizontal stabiliser or a vertical stabiliser. In this case the panel is typically a skin or cover panel with an outer aerodynamic surface over which air flows during flight of the aircraft, and an inner surface to which the stringer flange is joined. The stringer stiffens the panel and carries aerodynamic loads during flight of the aircraft.

A further aspect of the invention provides a method of manufacturing a structure according to any preceding claim, the method comprising folding or bending a blank along first and second fold lines to form the first and second corners of the rib foot; joining the first rib foot flange to the stringer web; joining the second rib foot flange to the panel or to the stringer flange; and joining the rib foot web to the first face of the rib web adjacent to the edge of the rib web.

The first rib foot flange may be joined to the stringer web by co-curing or co-bonding.

The second rib foot flange may be joined to the panel or to the stringer flange by co-curing or co-bonding.

The rib foot web may be joined to the rib web by co-curing or co-bonding, or more preferably it is joined to the rib web by one or more mechanical fasteners.

BRIEF DESCRIPTION OF THE DRAWINGS

Embodiments of the invention will now be described with reference to the accompanying drawings, in which.

DETAILED DESCRIPTION OF
EMBODIMENT(S)

Figure 1:
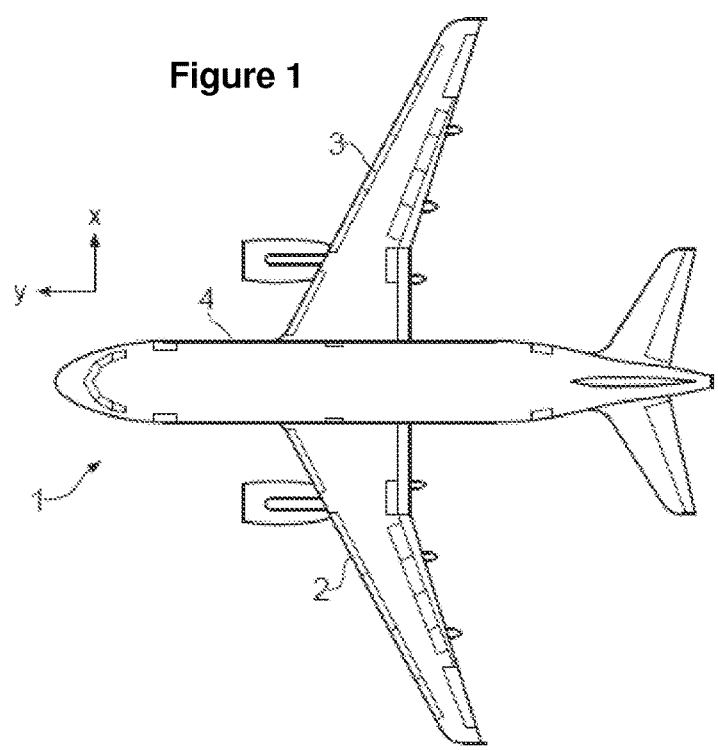
FIG. 1 is a plan view of an aircraft.

FIG. 1 shows an aircraft 1 with port and starboard wings 2, 3. Each wing has a cantilevered structure with a length extending in a spanwise direction from a root to a tip, the root being joined to an aircraft fuselage 4. The wings 2, 3 are similar in construction so only the starboard wing 3 will be described in detail with reference to FIGS. 2a and 2b.

Figure 2A:
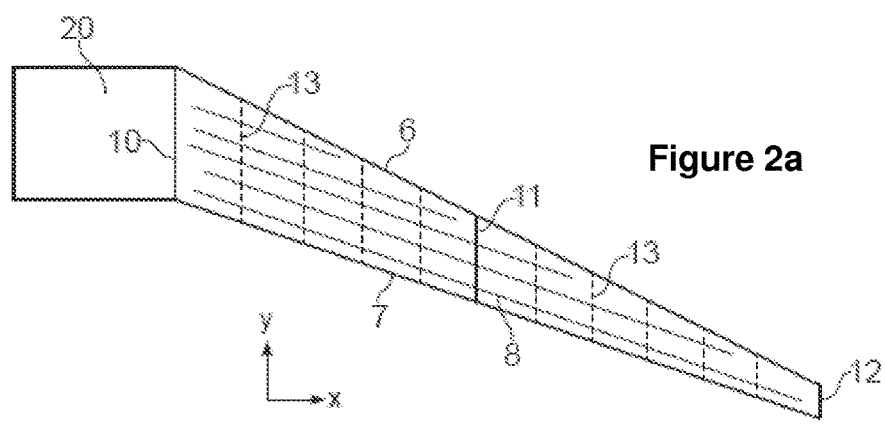
FIG. 2a is a schematic plan view of a starboard wing box and centre wing box.
Figure 2B:
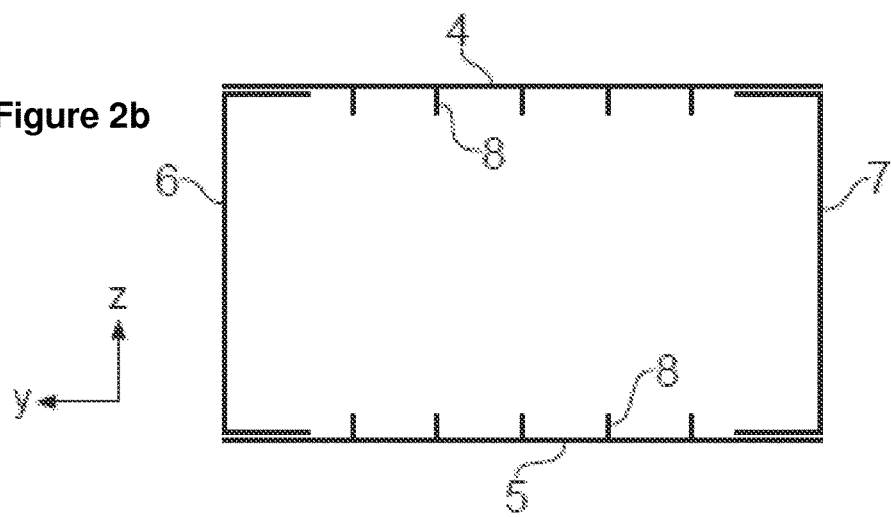
FIG. 2b is a schematic chord-wise sectional view of the starboard wing box.

The main structural element of the wing is a wing box formed by upper and lower covers 4, 5 and front and rear spars 6, 7 as shown in FIGS. 2a and 2b. The covers 4, 5 and spars 6, 7 are each Carbon Fibre Reinforced Polymer (CFRP) laminate components. Each cover is a panel with an aerodynamic surface (the upper surface of the upper cover 4 and the lower surface of the lower cover 5) over which air flows during flight of the aircraft. Each cover also has an inner surface carrying a series of stringers 8 extending in the spanwise direction. Each cover carries a large number of stringers 8, only five of which are shown in FIGS. 2a and 2b for the purposes of clarity. Each stringer 8 is joined to one cover but not the other, and runs in a span-wise direction approximately parallel to a length of the cover to which it is attached.

The wing box also has a plurality of transverse ribs which run in a chord-wise direction, approximately transverse to the stringers and across the width of the covers, each rib being joined to the covers 4, 5 and the spars 6, 7. The ribs include an innermost inboard rib 10 located at the root of the wing box, and a number of further ribs spaced apart from the innermost rib along the length of the wing box. The wing box is divided into two fuel tanks: an inboard fuel tank bounded by the inboard rib 10 and mid span rib 11, the covers 4, 5 and the spars 6, 7; and an outboard fuel tank bounded by the mid span rib 11 an outboard rib 12 at the tip of the wing box, the covers 4, 5 and the spars 6, 7.

The inboard rib 10 is an attachment rib which forms the root of the wing box and is joined to a centre wing box 20 within the body of the fuselage 4. Baffle ribs 13 (shown in dashed lines) form internal baffles within the fuel tanks which divide the fuel tanks into bays. The ribs 10, 11, 12 are sealed to prevent the flow of fuel out of the two fuel tanks, but the baffle ribs 13 are not sealed so that fuel can flow across them between the bays. As can be seen in FIG. 2a, the stringers 8 stop short of the inboard rib 10 and the outboard rib 12, but pass through the baffle ribs 13 and the mid span rib 11.

Figure 3:
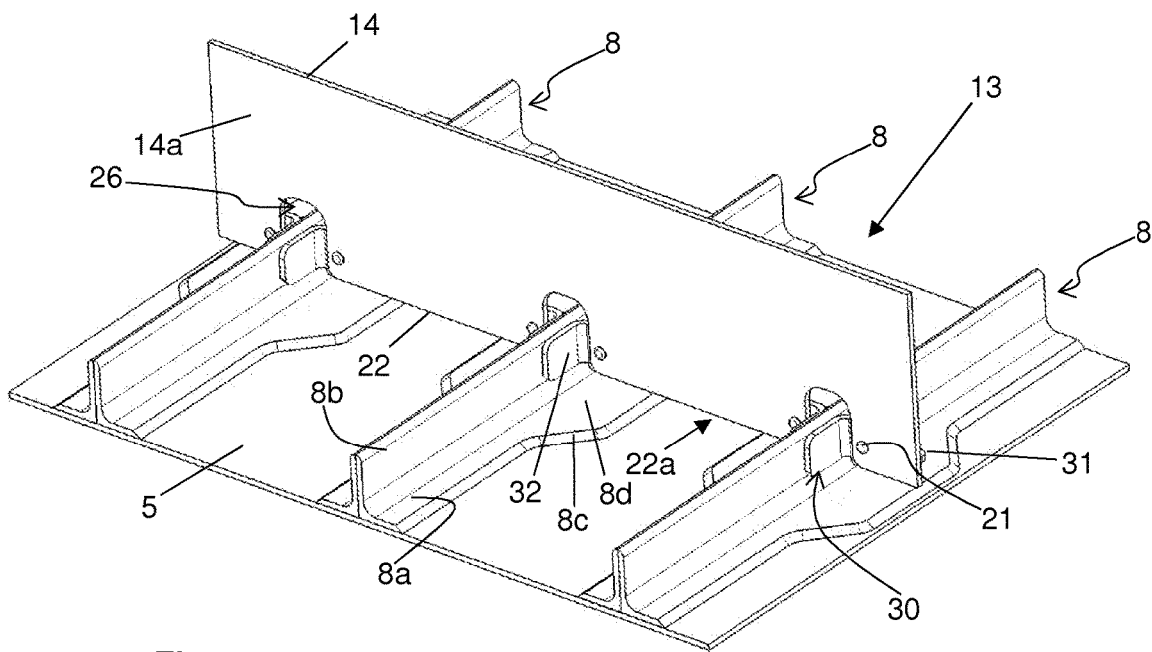
FIG. 3 is an isometric view of a structure according to a first embodiment of the invention.

FIG. 3 shows a structure forming part of the interface between one of the baffle ribs 13 and the lower cover 5, including three of the stringers 8. The stringers 8 are CFRP laminate components. Each stringer 8 has a T-shaped cross-section with a pair of flanges 8a co-cured to the cover 5, and a web or blade 8b extending upwardly from the flanges 8a away from the cover 5 to a free upper edge. Each flange 8a has a tapering lateral edge 8c. The stringers 8 have a "roll-formed" structure in which the flanges 8a and web 8b are formed from a single folded sheet.

The baffle rib 13 comprises a planar metallic web 14 connected to the lower cover 5 by a plurality of CFRP laminate rib feet 30.

Figure 4:
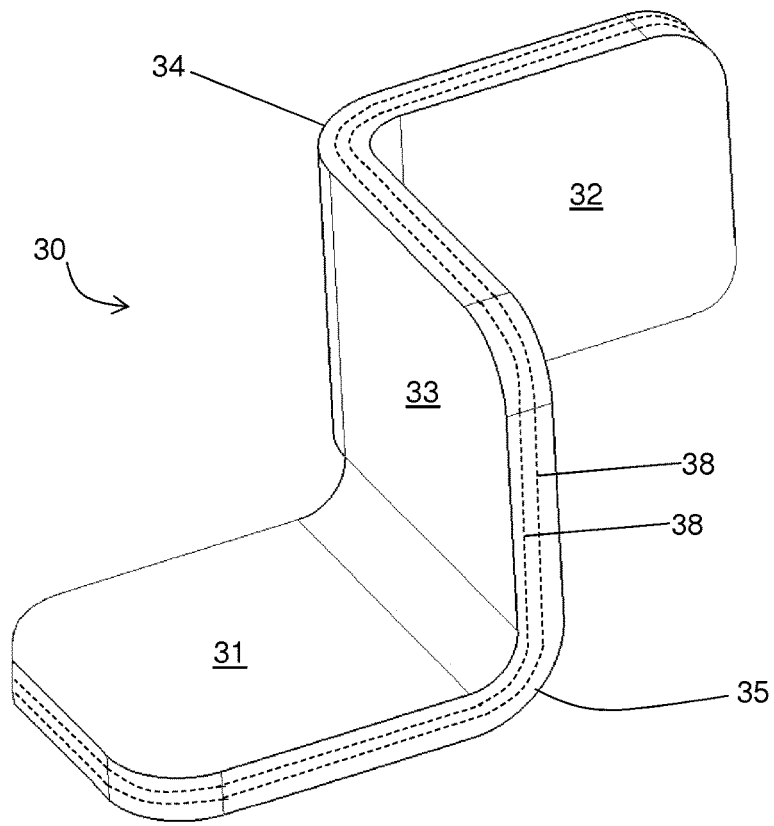
FIG. 4 is an isometric view of the rib foot of the structure of FIG. 3.

As shown in FIG. 4, each rib foot 30 has a generally horizontal second rib foot flange 31, an upstanding second rib foot flange 32; and an upstanding rib foot web 33. The first rib foot flange 32 is connected to the rib foot web 33 by a first folded corner 34. The second rib foot flange 31 is connected to the rib foot web 33 by a second folded corner 35.

The second rib foot flange 32 is co-cured to the stringer web 8b, and the second rib foot flange 31 is co-cured to a protruding grow-out region 8d of the stringer flange 8a. This co-cured joint (without bolts) between the first rib foot flange 31 and the stringer flange 8a means that no drilled bolt holes need to be provided in the cover. This enables the thickness (and hence weight) of the cover 5 to be reduced compared with a bolted arrangement. The lack of external bolts in the cover 5 also provides protection against lightning strike and improved fuel tank sealing.

Each stringer is joined to the rib by a pair of rib feet 30—one on each side of the stringer web 8b which are mirror images of each other.

Each rib foot web 33 is joined to the rib web 14 by a bolt 21.

The rib web 14 has planar inboard and outboard faces 14a, 14b on opposite sides of the web which meet at a lower edge 22 shown in FIG. 3, and an upper edge (not shown in FIG. 3). Only the inboard face 14a of the rib web is visible in FIG. 3. The lower edge 22 is separated from the inner surface of the cover 5 by a gap 22a. Fuel can flow across the rib web 14 through this gap 22a. The lower edge of the rib web 14 is also formed with recesses or cut-outs through which the stringer webs 8b pass. Fuel can also flow through the arched upper part 26 of each cut-out. Holes (not shown) may also be provided in the rib web 14 to minimise its weight and provide further routes for fuel to flow.

The rib foot web 33 is joined to the outboard face of the rib web adjacent to the lower edge 22. The rib foot flange 31 of each rib foot extends in an outboard direction away from the outboard face 14b of the rib web and the other rib foot flange 32 of each rib foot passes across the edge 22 of the rib web through the recess or cut-out (along with the stringer web 8b to which it is attached) and then extends in an inboard direction away from the inboard face 14a of the rib web as shown in FIG. 3.

In an alternative embodiment (not shown) the rib foot web 33 of each rib foot is joined to the inboard face 14a of the rib web. In this case, for each rib foot the rib foot flange 32 extends away from the inboard face 14a of the rib web, and the other rib foot flange 31 passes across the edge 22 of the rib web through the gap 22a and then extends away from the outboard face 14b of the rib web.

In both of these embodiments the rib foot web 33 and the rib web 14 have opposed mating faces which are joined at a web joint interface which lies in a plane (i.e. the plane of the inboard face 14a or the plane of the outboard face depending on which face is used to attach the rib foot). One of the rib foot flanges is positioned on one side of this plane, and the other one of the flanges is positioned on the other side of the plane. This provides a more balanced arrangement than if both rib foot flanges were positioned on the same side of the plane.

Only the lower edge 22 of the rib web 14 is shown in FIG. 3. The upper edge of the rib web may be connected to the upper cover 4 by rib feet 30 in a similar fashion, or it may be connected to the upper cover by more conventional rib feet.

The rib web 14 also has fore and aft edges (visible in FIG. 2a) which are secured to the spars 6, 7.

Figure 5:
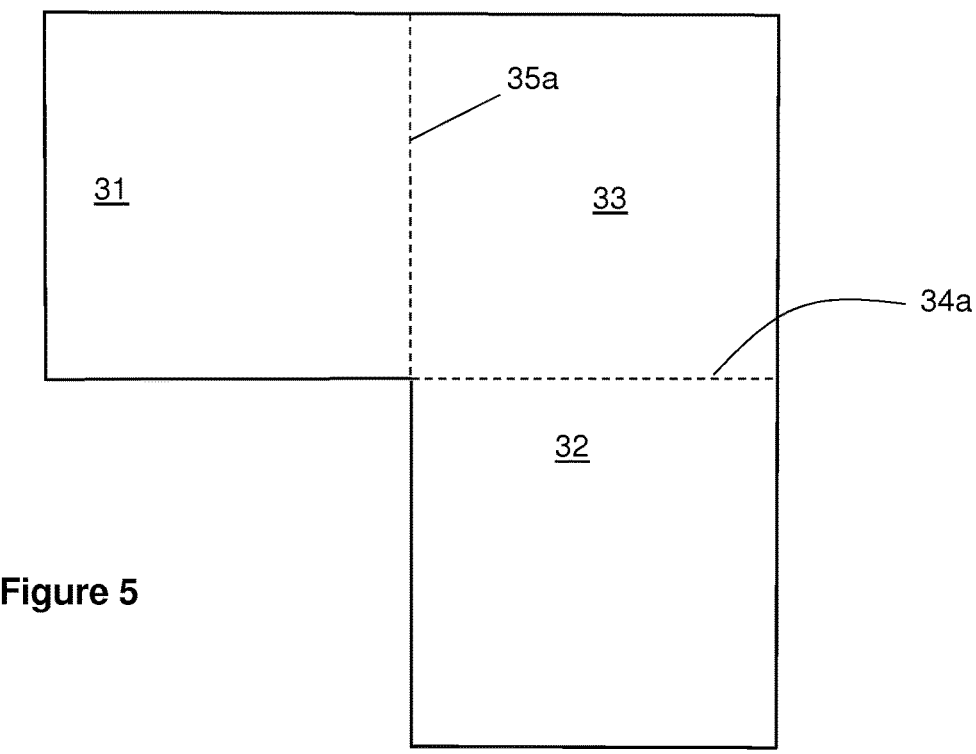
FIG. 5 is a plan view of a blank for forming the rib foot of FIG. 4.
Figure 6:
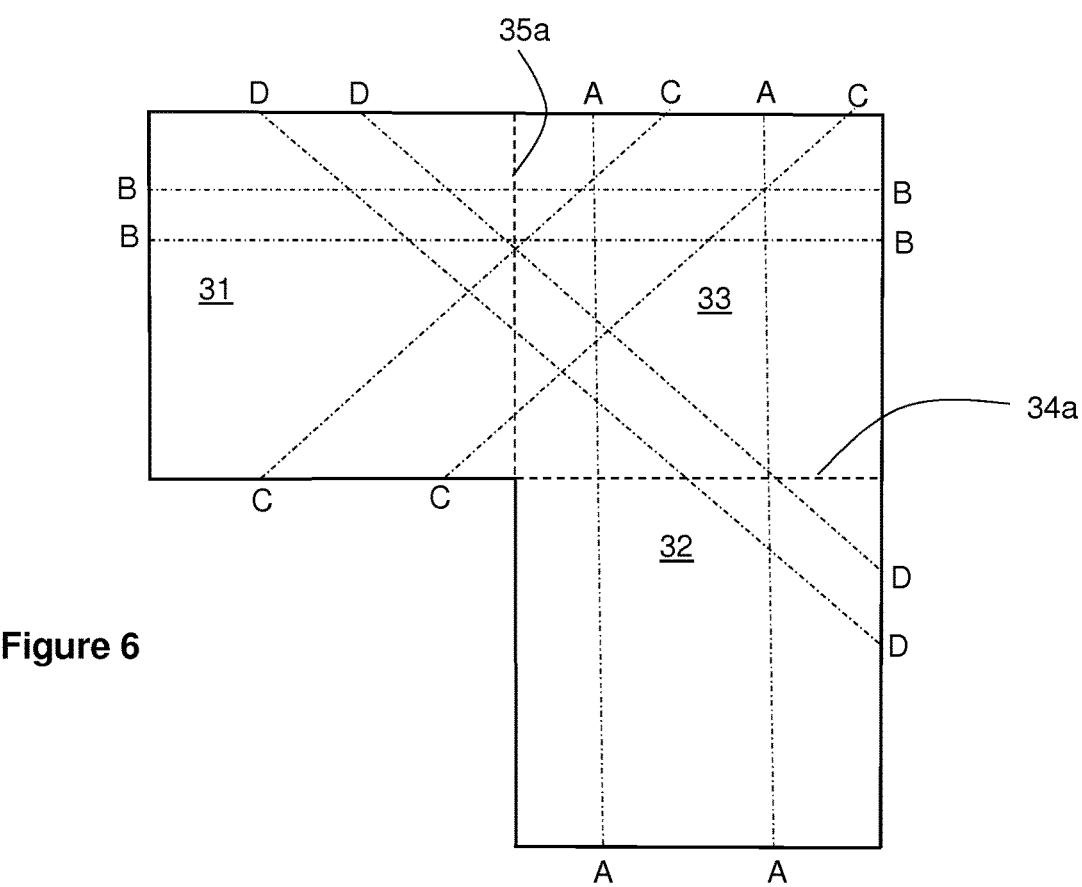
FIG. 6 is a plan view of the blank of FIG. 5 showing some of the reinforcement fibres.
Figure 7A:
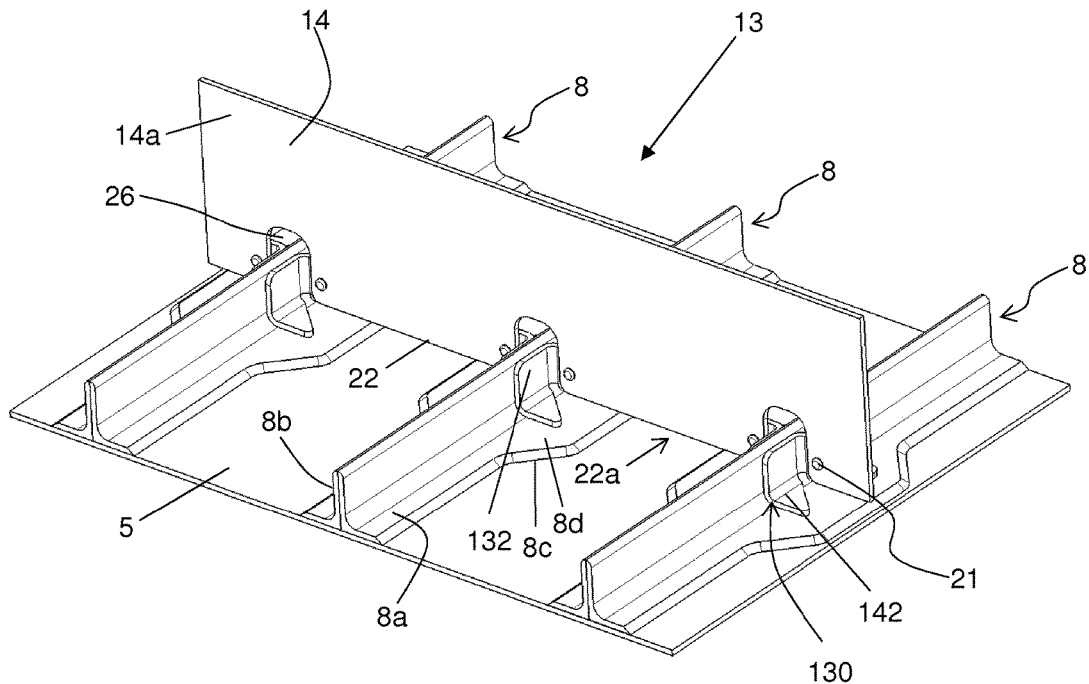
FIG. 7a is an isometric view of a structure according to a second embodiment of the invention, viewed from an inboard side of the rib.
Figure 7B:
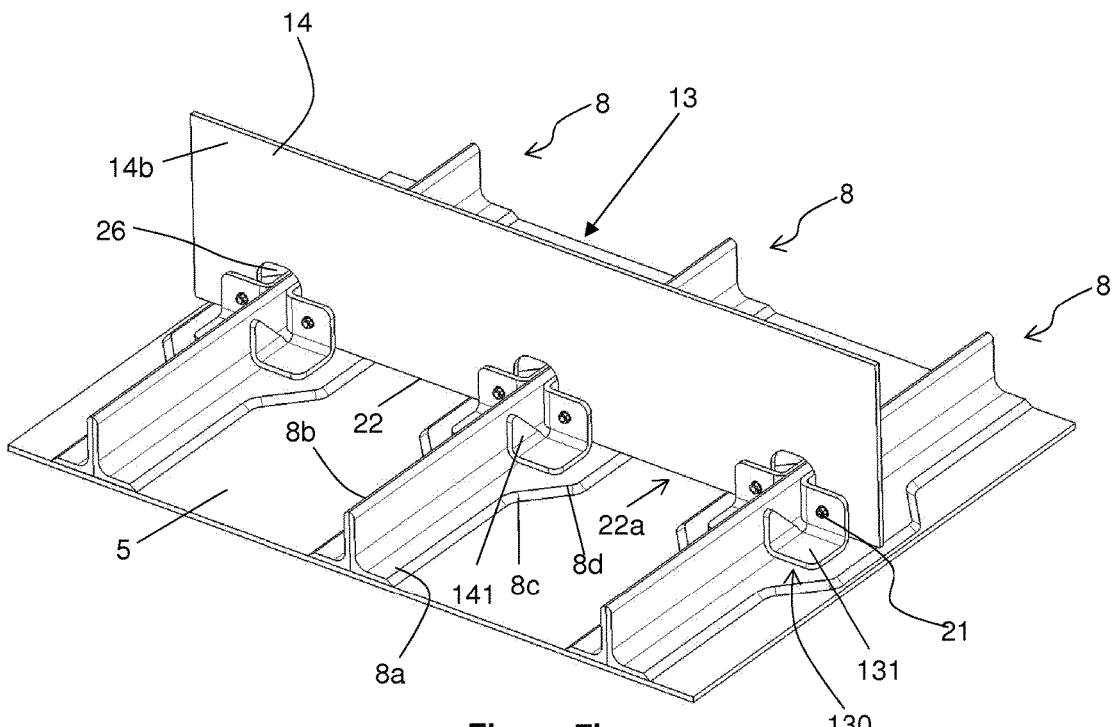
FIG. 7b is an isometric view of the structure of FIG. 7a, viewed from an outboard side of the rib.

Each rib foot 30 is formed from a blank comprising a flat stack of pre-preg composite plies in the shape shown in FIGS. 5 and 6. Each ply in the stack consists of unidirectional carbon fibres impregnated with an epoxy resin matrix.

The first rib foot flange 32 is bent or folded away from the rib foot web 33 in a first direction along a first fold line 34a to form the first corner 34, and the second rib foot flange 31 is bent or folded away from the rib foot web 33 in a second direction along a second fold line 35a to form the second corner 35.

The carbon fibres in each ply are orientated at either 0 degrees, +/−45 degrees or 90 degrees. FIG. 6 shows by way of example two 0 degree fibres A, two 90 degree fibres B, two +45 degree fibres C, and two −45 degree fibres D. Some of the 0 degree fibres (including the fibres A) run continuously from the rib foot web 33 to the second rib foot flange 31 via the folded corner 35. Some of the 90 degree fibres (including the fibres B) run continuously from the first rib foot flange 32 into the rib foot web 33 via the folded corner 34. Some of the +45 degree fibres (including the fibres C) run continuously from the first rib foot flange 32 to the rib foot web 33 via the folded corner 34. Some of the −45 degree fibres (including the fibres D) run continuously from the second rib foot flange 31 to the first rib foot flange 32 via the folded corner 35, the rib foot web 33 and the folded corner 34. In this way, loads are transferred by the carbon fibres around each of the folded corners.

The stack of pre-preg plies includes a pair of external plies and a plurality of internal plies sandwiched between the external plies, two of which are indicated by dashed lines and labelled 38 in FIG. 4. The external plies and the internal plies 38 (along with most if not all of the other plies in the stack) run continuously from the first rib foot flange 32 into the rib foot web 33 via the corner 34, and from the rib foot web 33 into the second rib foot flange 31 via the corner 35.

A structure according to a second embodiment of the invention is shown in FIGS. 7a to 9. The rib feet 130 are similar to the rib feet 30 in the first embodiment, and like features in the rib feet 130 are depicted with like reference numerals (preceded by the number 1) and will not be described further. FIG. 7b shows the outboard face 14b of the rib web 14.

Each rib foot 130 in this embodiment has a triangular third rib foot flange 142 which is co-cured to the grow out region 8d of the stringer flange 8a and connected to the first flange 132 by a third corner 144. Each rib foot 130 also includes a triangular fourth rib foot flange 141 that is co-cured to the stringer web 8b and connected to the second rib foot flange 131 by a fourth corner 145.

Figure 10:
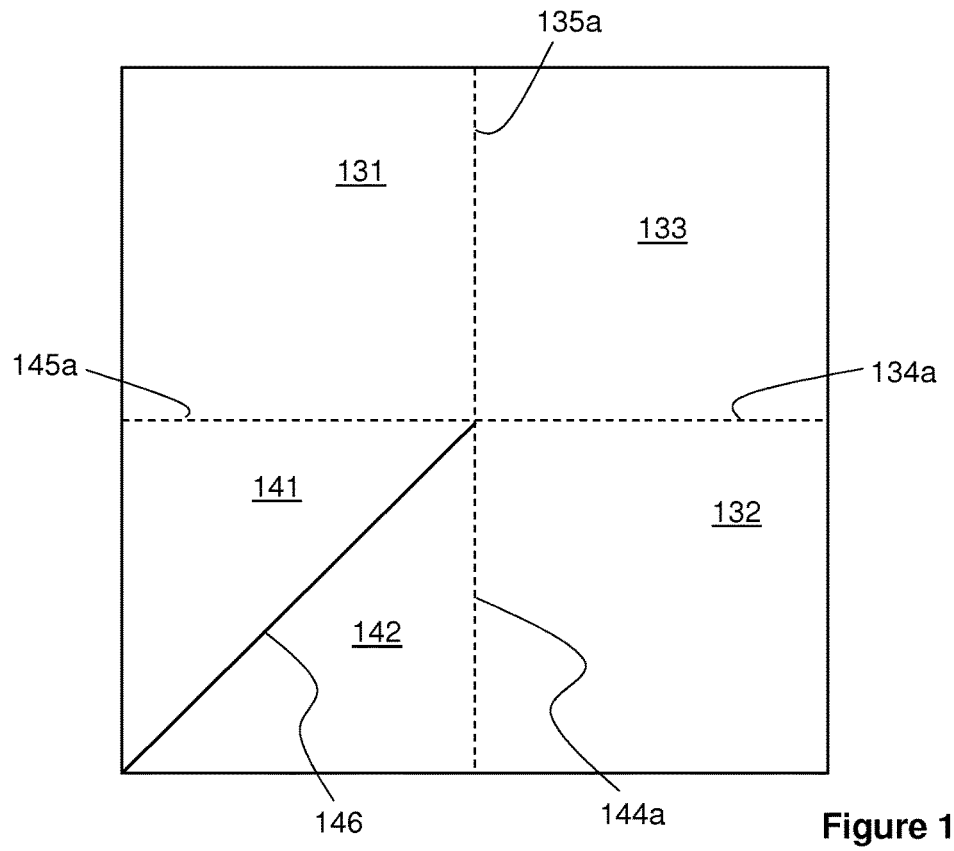
FIG. 10 is a plan view of a blank for forming the rib foot of FIG. 9.

Each rib foot 130 is formed from a blank comprising a flat stack of pre-preg composite plies in the shape shown in FIG. 10. The triangular rib foot flanges 142, 141 are formed by cutting the blank along a diagonal line 146, then bending or folding them away from the rib foot flanges 132, 131 along respective fold lines 144a, 145a.

Figure 11:
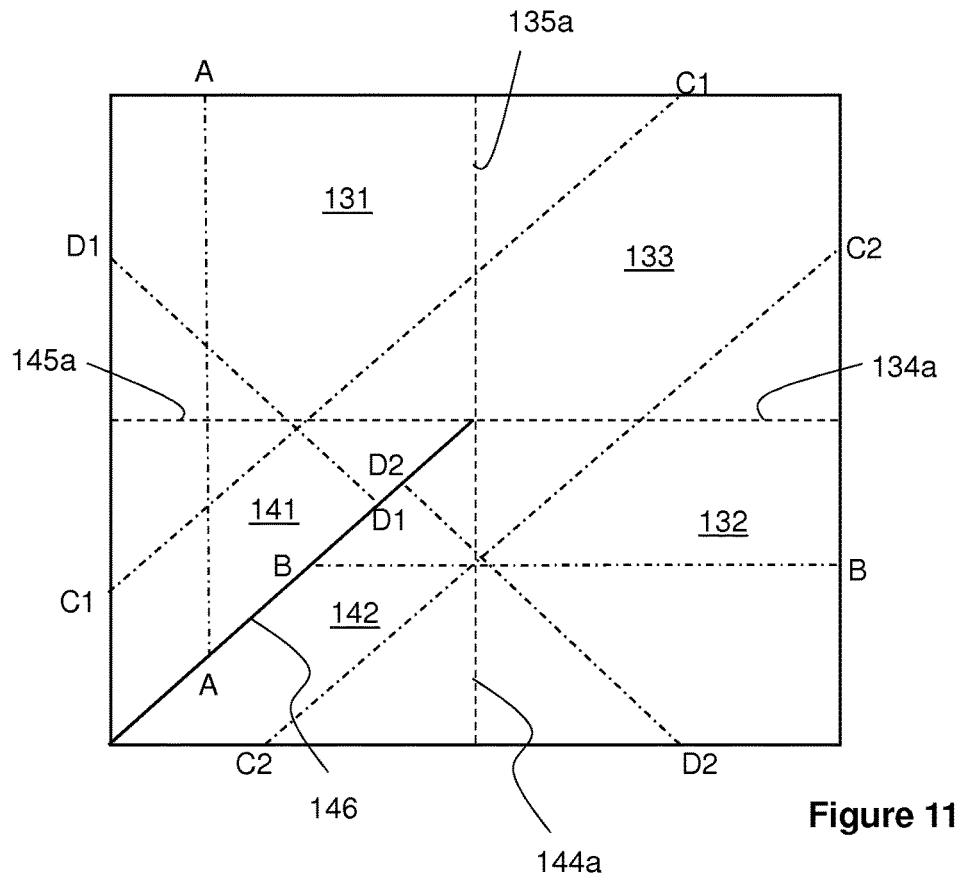
FIG. 11 is a plan view of the blank of FIG. 10 showing some of the reinforcement fibres.

The carbon fibres in each ply are orientated at either 0 degrees, +/−45 degrees or 90 degrees. FIG. 11 shows by way of example one 0 degree fibre A, one 90 degree fibre B, two +45 degree fibres C1, C2 and two −45 degree fibres D1, D2. Some of the fibres (including the fibres A, C1 and D1 shown in FIG. 11) run continuously from the first second rib foot flange 131 into the fourth rib foot flange 141 via the corner 145. Some of the fibres (including the fibres B, C2 and D2 shown in FIG. 11) run continuously from the rib foot flange 132 into the third rib foot flange 142 via the corner 144. Some of the +45° fibres (including the fibre C1) run continuously from the fourth rib foot flange 141 into the second rib foot flange 131 via the corner 145 and into the rib foot web 133 via the corner 135. Other ones of the +45° fibres (including the fibre C2) run continuously from the third rib foot flange 142 into the first rib foot flange 132 via the corner 144 and into the rib foot web 133 via the corner 134. In this way loads are transferred by the carbon fibres around each of the folded corners.

The rib feet 30, 130 are formed by press-forming a flat blank of pre-preg plies. During the press forming process, the blank is heated and the rib foot web 33, 133 is clamped between upper and lower cuboid dies. A press forming tool is then used to fold the flange 31, 131 up against a front face of the upper die, and to fold the flange 32, 132 down against a right face of the lower die. This is the end of the press-forming process for the rib foot 30. For the rib foot 130, the press forming process continues with the press forming tool folding the triangular flange 141 in against a right face of the upper die and folding the triangular flange 142 back against a front face of the lower die.

The rib foot 30 requires a complex four-armed noodle filler, with two arms engaging the outside of the corners 34, 35, a third arm in the gap between the rib foot flange 32 and the stringer web 8b, and a fourth arm in the gap between the rib foot flange 31 and the stringer flange 8a. The advantage of the rib foot 130 is that the third and fourth arms of the noodle filler are not required since the gaps are occupied by the corners 144, 145. This enables a simpler two-armed noodle filler to be used.

In the examples above, the rib feet 30, 130 are formed by pre-preg composite parts. Alternatively, the rib feet 30, 130 may be manufactured by injection moulding of an epoxy resin (or other liquid matrix material) containing short fibre reinforcement elements. In the embodiments described above the rib feet 30, 130 and stringers 8 are formed as separate components which are joined together by co-curing opposed mating faces. Alternatively, some of the internal plies forming the rib feet 30, 130 may be laid up so that they are interleaved with some of the internal plies forming the stringers 8.

Figure 8:
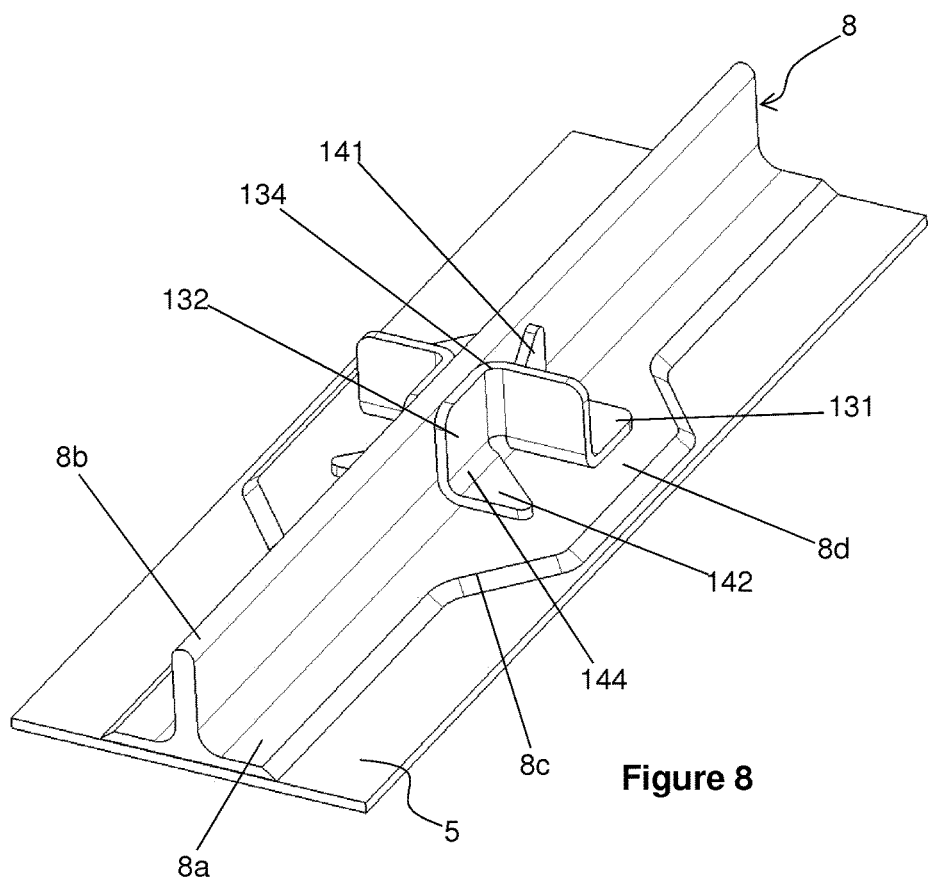
FIG. 8 is an isometric view of the structure of FIG. 7a before the rib has been installed.
Figure 9:
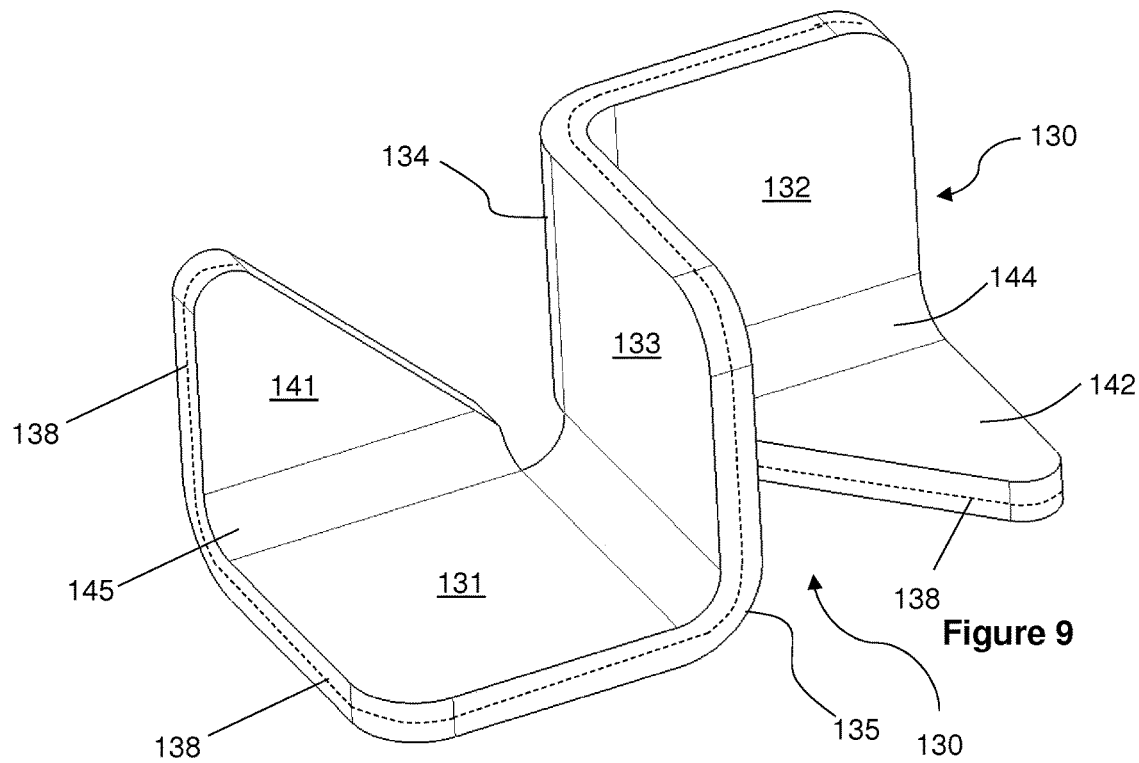
FIG. 9 is an isometric view of the rib foot of the structure of FIGS. 7a, 7b and 8.

The cover assembly of FIGS. 3 and 8 is formed by placing the various components on a mould in an un-cured or partly cured state. A vacuum bag is laid over the components on the mould, the space between the vacuum bag and the mould is evacuated to apply pressure, and the assembly is heated to cure the components. As the components cure, the various co-cured joints mentioned above are formed. The mould may be made from a rigid material, or more preferably from a semi rigid material. A suitable semi rigid material is a synthetic rubber such as air pad (an un-cured non silicon rubber available from Airtech Europe SARL) reinforced with open weave dry carbon such as cristex 170-100, with additional local reinforcement and therefore stiffness added with toolmaster (R) pre-preg TMGP4000 and TMGP4100.

Although the invention has been described above with reference to two preferred embodiments, it would be appreciated that various changes or modifications may be made without departing from the scope of the invention as defined in the appended claims.

The invention claimed is:

1. An Aircraft structure having a panel, a stringer and a rib, wherein the stringer includes a stringer flange joined to the panel and a stringer web extending away from the stringer flange; and the rib includes a rib web having first and second faces which meet at an edge, and a rib foot having a first rib foot flange joined to the stringer web, a second rib foot flange joined to the panel or to the stringer flange, and a rib foot web joined to the first face of the rib web adjacent to the edge of the rib web; wherein the first rib foot flange is connected to the rib foot web by a first corner including at least one layer which runs continuously from the first rib foot flange into the rib foot web via the first corner, the second rib foot flange is connected to the rib foot web by a second corner including at least one layer which runs continuously from the second rib foot flange into the rib foot web via the second corner, one of the rib foot flanges extends away from the first face of the rib web, and the other of the rib foot flanges passes across the edge of the rib web and extends away from the second face of the rib web.

2. The aircraft structure according to claim 1, wherein the rib foot comprises a third rib foot flange that is joined to the panel or to the stringer flange and connected to the first rib foot flange by a third corner including at least one layer which runs continuously from the third rib foot flange to the first rib foot flange via the third corner.

3. The aircraft structure according to claim 1, wherein the rib foot comprises a fourth rib foot flange that is joined to the stringer web and connected to the second rib foot flange by a fourth corner including at least one layer which runs continuously from the fourth rib foot flange to the second rib foot flange via the fourth corner.

4. The aircraft structure according to claim 1, wherein the rib foot comprises a third rib foot flange that is joined to the panel or to the stringer flange and connected to the first rib foot flange by a third corner including at least one layer which runs continuously from the third rib foot flange to the first rib foot flange via the third corner, wherein the rib foot comprises a fourth rib foot flange that is joined to the stringer web and connected to the second rib foot flange by a fourth corner including at least one layer which runs continuously from the fourth rib foot flange to the second rib foot flange via the fourth corner, and wherein the third and fourth rib foot flanges are triangular.

5. The aircraft structure according to claim 1, wherein the second rib foot flange extends away from the first face of the rib web and the first rib foot flange passes across the edge of the rib web and extends away from the second face of the rib web.

6. The aircraft structure according to claim 1, wherein the stringer web passes through a recess in the edge of the rib web.

7. The aircraft structure according to claim 6, wherein the second rib foot flange extends away from the first face of the rib web, and the first rib foot flange passes across the edge of the rib web through the recess and extends away from the second face of the rib web.

8. The aircraft structure according to claim 1, wherein the rib foot web is joined to the first face of the rib web at a web joint interface which lies in a plane, one of the rib foot flanges is positioned on one side of the plane, and the other of the rib foot flanges is positioned on the other side of the plane.

9. The aircraft structure according to claim 1, further comprising a second panel opposite to the panel, wherein the rib web is joined to the second panel.

10. The aircraft structure according to claim 1 having a plurality of stringers, wherein each stringer includes a stringer flange joined to the panel and a stringer web extending away from the stringer flange of each of the plurality of stringers; and a plurality of rib feet each having a first rib foot flange joined to a respective stringer web, a second rib foot flange joined to the panel or to a respective stringer flange, and a rib foot web joined to the first face of the rib web adjacent to the edge of the rib web; wherein each first rib foot flange is connected to a respective rib foot web by a first corner including at least one layer which runs continuously from the first rib foot flange into the respective rib foot web of the plurality of rib feet via the first corner, each second rib foot flange is connected to a respective rib foot web by a second corner including at least one layer which runs continuously from the second rib foot flange into the rib foot web via the second corner, one of the rib foot flanges of each rib foot extends away from the first face of the rib web, and the other of the rib foot flanges of each rib foot passes across the edge of the rib web and extends away from the second face of the rib web.

11. The aircraft structure according to claim 1, wherein the first rib foot flange is joined to the stringer web by a co-cured or co-bonded joint.

12. The aircraft structure according to claim 1, wherein the second rib foot flange is joined to the panel or to the stringer flange by a co-cured or co-bonded joint.

13. The aircraft structure according to claim 1, wherein the rib foot is formed from a composite material comprising a plurality of fibres, some of the fibres run continuously from the first rib foot flange into the rib foot web via the first corner, and some of the fibres run continuously from the second rib foot flange into the rib foot web via the second corner.

14. The aircraft structure according to claim 1, wherein the structure is part of an aerodynamic aircraft structure, and the panel is a skin or cover panel with an outer aerodynamic surface over which air flows during flight of the aircraft and an inner surface to which the (or each) stringer flange is joined.

15. A method of manufacturing an aircraft structure, the structure having a panel, a stringer and a rib, wherein the stringer includes a stringer flange joined to the panel and a stringer web extending away from the stringer flange; and the rib includes a rib web having first and second faces which meet at an edge, and a rib foot having a first rib foot flange joined to the stringer web, a second rib foot flange joined to the panel or to the stringer flange, and a rib foot web joined to the first face of the rib web adjacent to the edge of the rib web; wherein the first rib foot flange is connected to the rib foot web by a first corner including at least one layer which runs continuously from the first rib foot flange into the rib foot web via the first corner, the second rib foot flange is connected to the rib foot web by a second corner including at least one layer which runs continuously from the second rib foot flange into the rib foot web via the second corner, one of the rib foot flanges extends away from the first face of the rib web, and the other of the rib foot flanges passes across the edge of the rib web and extends away from the second face of the rib web; the method comprising folding or bending a blank along first and second fold lines to form the first and second corners of the rib foot; joining the first rib foot flange to the stringer web; joining the second rib foot flange to the panel or to the stringer flange; and joining the rib foot web to the first face of the rib web adjacent to the edge of the rib web.

16. The structure according to claim 1, wherein the rib foot is formed as a single part.

17. An Aircraft structure having a panel, a stringer and a rib, wherein the stringer includes a stringer flange joined to the panel and a stringer web extending away from the stringer flange; and the rib includes a rib web having first and second faces which meet at an edge, and a rib foot having a first rib foot flange joined to the stringer web, a second rib foot flange joined to the panel or to the stringer flange, and a rib foot web joined to the first face of the rib web adjacent to the edge of the rib web; wherein the first rib foot flange is connected to the rib foot web by a first corner including at least one layer which runs continuously from the first rib foot flange into the rib foot web via the first corner, the second rib foot flange is connected to the rib foot web by a second corner including at least one layer which runs continuously from the second rib foot flange into the rib foot web via the second corner, one of the rib foot flanges extends away from the first face of the rib web, and the other of the rib foot flanges passes across the edge of the rib web and extends away from the second face of the rib web, wherein the rib foot is formed from a composite material including reinforcement fibres and at least some of the reinforcement fibres run continuously from the second rib foot flange to the first rib foot flange via the second corner, the rib foot web and the first corner.

18. The aircraft structure according to claim 17, wherein the rib foot comprises a third rib foot flange that is joined to the panel or to the stringer flange and connected to the first rib foot flange by a third corner including at least one layer which runs continuously from the third rib foot flange to the first rib foot flange via the third corner.

19. The aircraft structure according to claim 17, wherein the rib foot comprises a fourth rib foot flange that is joined to the stringer web and connected to the second rib foot flange by a fourth corner including at least one layer which runs continuously from the fourth rib foot flange to the second rib foot flange via the fourth corner.

20. The aircraft structure according to claim 17, wherein the rib foot comprises a third rib foot flange that is joined to the panel or to the stringer flange and connected to the first rib foot flange by a third corner including at least one layer which runs continuously from the third rib foot flange to the first rib foot flange via the third corner, wherein the rib foot comprises a fourth rib foot flange that is joined to the stringer web and connected to the second rib foot flange by a fourth corner including at least one layer which runs continuously from the fourth rib foot flange to the second rib foot flange via the fourth corner, and wherein the third and fourth rib foot flanges are triangular.

* * * * *